Figure 1:
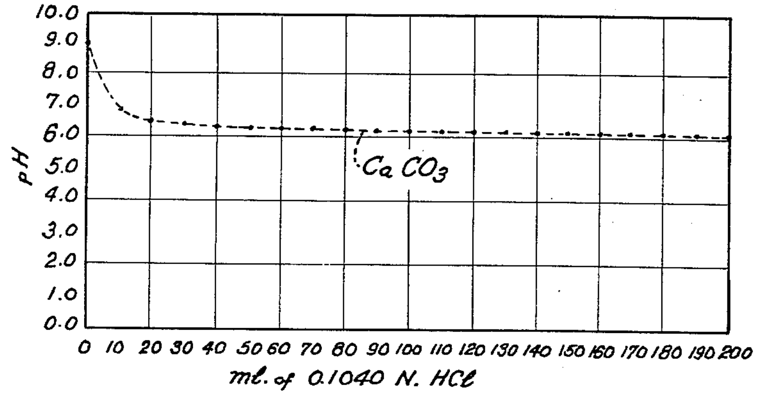

June 14, 1960 B. R. WEINSTEIN 2,940,897
NUTRIENT ANTACID COMPOSITION AND
METHOD OF MAKING THE SAME
Filed May 8, 1956

INVENTOR.
Bernard R. Weinstein
BY
Louis Robertson
att'y.

United States Patent Office 2,940,897
Patented June 14, 1960

2,940,897

NUTRIENT ANTACID COMPOSITION AND METHOD OF MAKING THE SAME

Bernard R. Weinstein, Ashton, Ill., assignor, by mesne assignments, to Crest Foods Co., Inc., Ashton, Ill., a corporation of Illinois Filed May 8, 1956, Ser. No. 583,419

12 Claims. (Cl. 167—55)

This invention relates to antacids, i.e., pharmaceutical chemical products for neutralizing hyperacidity in the stomach and intestines. More particularly, it contemplates a reaction product prepared from milk proteins and an antacid chemical and possesses both nutritional and therapeutic properties.

A number of alkaline compounds have long been employed for the purpose of more or less neutralizing the acid juices of the stomach. This class or group of chemicals are known, in medical terminology, as antacids. Typical antacids are calcium carbonate, lime-water, milk of magnesia, aluminum hydroxide, magnesium carbonate, and sodium bicarbonate. All of the antacids are capable of serving, with proper dosage, to elevate the pH of the contents of the stomach for a period of time depending upon the alkalinity or buffering characteristic of the particular antacid or antacids used and the amount of the dosage. Unfortunately, many of these agents are harsh in their action and side effects, differing with different individuals, limit their usefulness. Such undesirable side effects may include constitpation or purgation and, particularly with bismuth compounds, the formation of hard or black stools. The blending of two or more different antacid agents has been employed with limited success in an attempt to counter the side effects. It has not been possible to satisfactorily control, in this way, the undesirable reactions mentioned above or to prevent the irritation of mucous tissues.

The principal object of the invention herein described is to provide an antacid composition which, when taken into the stomach, will neutralize and buffer stomach liquids and maintain, over a relatively prolonged period of time, a level of acidity which is satisfactory in almost all instances where neutralization by an external agent is indicated while, at the same time, avoiding alkalizing to such an extent that digestion cannot proceed properly. A further object is to provide an antacid composition of this character, the use of which is not accompanied by more than easily tolerable side effects. Additional advantageous characteristics reside in the nutritional value of the material itself, the uniformity of results with different individuals, avoidance of mucous membrane irritation, and gentleness and uniformity of action throughout the sphere of influence. The antacid composition may be intimately mixed with other therapeutic materials, such as aspirin, without adverse effect on such materials as experienced with ordinary antacid agents. Additionally, and of considerable importance, hyperacidity can be controlled without inducing a residual alkaline condition.

The antacid composition is the reaction product of a milk protein or mixture of proteins derived from milk and an antacid reagent. The principal milk proteins are casein and lactalbumin. Other proteins are also present in much smaller quantities and are generally present with commercially prepared albumin. All of these proteins are useful in the preparation of the antacid composition described herein. The preferred product is made from lactalbumin, and satisfactory products may be prepared from a mixture of lactalbumin and casein, or from casein alone. Preference for the albumin-base product reflects the somewhat superior acid-absorbing properties of this composition.

Any of the members of the class of chemical reagents known as antacids may be used for reaction with the protein material in the preparation of the buffering antacid composition. The following compounds are listed by way of examples of suitable antacid reagents: calcium carbonate, calcium lactate, calcium sulfate, calcium hydroxide, calcium gluconate, aluminum hydroxide, magnesium hydroxide, magnesium trisilicate, magnesium carbonate, sodium carbonate, sodium bicarbonate, ammonium hydroxide, bismuth subnitrate, bismuth subcarbonate, and bismuth subgallate.

Reaction of the antacid chemical compound with the protein is accomplished by mixing the antacid reagent with a water slurry of the protein in the form which may be called "activated" or "solubilized," and cooking the mixture at a temperature of between 140° to 190° F. for a period of time sufficient to bring about the desired reaction as indicated by the gradual transition of the entire mass to the consistency of a heavy paste. Since the pH of the cook changes gradually as the reaction proceeds during the cooking process, the end point may be determined by pH, predetermined for a given recipe. The time required for the reaction varies with the temperature of the cook and the reactivity of the particular antacid constituent. The resulting product may be dried by known processes, such as spray or roller drying.

A suitable raw protein material is the coprecipitated casein-lactalbumin prepared by the process described in Patent No. 2,623,038 of Everette C. Scott. This product is a casein-lactalbumin fusion which must be activated preliminarily to the reaction with the antacid reagent. This may be accomplished by the method described in Patent No. 2,832,685 of Everette E. Scott, whereby a water slurry of the fusion is alkalized by means of a strong alkali, such as potassium hydroxide, to a pH of 6.6 to 6.7, a volatile alkali, such as ammonium hydroxide, is added to bring the pH to approximately 8.4 to 8.5, and the mixture is heated to a temperature of between 150° F. and 212° F. to hydrate the protein and render the same dispersable and activated, ready for the reaction with the antacid chemical.

As a specific example of a satisfactory process for the preparation of the nutrient antacid composition of this invention from skim milk, the following complete and detailed specification is given:

The skim milk is delivered to a suitable receptacle such as a conventional cheese vat. At this point, the normal titratable acidity, measured as lactic acid, is 0.16% to 0.18%. The titratable acidity is adjusted downwardly by the addition of a suitable alkalizing material to a point where the titratable acidity ranges between 0.16% and 0.1%. Sodium bicarbonate or soda ash, or a combination of these two materials, are suitable for this acidity reduction. The milk is then heated to a temperature of between 190° F. to 194° F. The application of heat and agitation of the milk is then discontinued and dilute hydrochloric acid is added to bring about the complete precipitation of all casein, lactalbumin and lactoglobulin fractions of the milk. The result is a homogeneous mass of precipitated protein.

The whey is withdrawn from the vat. The precipitated protein is then washed with hot water until all or practically all of the whey is removed. The washing is usually accompanied by the breaking up of the masses of curd by milling. The protein material is pressed or centrifuged to remove free liquid, then finely comminuted and transferred to a steam kettle with a double action agitator for activation preparatory for the final antacid reaction.

The solubilization or activation of the protein is carried out under careful pH control. The pH of the denatured curd before the addition of any alkalizing material is 5.7 to 5.8. A strong alkali, such as potassium hydroxide is added to the slurry to bring the pH to 6.6 to 6.7 and a volatile alkali, such as ammonium hydroxide, is added to bring the pH to about 8.3 and the slurry is heated to a temperature of about 170° F. to 180° F., at which temperature the protein material is hydrated to an activated state, ready for the antacid reaction.

It should be understood that the foregoing outline of procedure is that which is preferred for the purpose of preparing the protein for reaction in accordance with the invention. Variations and alternatives of this procedure for activation of the protein material may be employed.

To this slurry, a selected antacid reagent, as, for example, calcium carbonate, is added in the form of a solution of this chemical. The relative proportions of protein and calcium carbonate may vary from about 5 parts of calcium carbonate and 95 parts of protein solids, to about 60 parts of calcium carbonate and 40 parts of protein solids. This mixture is held at a temperature of about 170° F. for a period of about 30 minutes, which is approximately the length of time necessary to complete the reaction of this particular combination. This reaction product is then comminuted and dried by known techniques, such as spray drying. The resulting product is a nutrient antacid composition of this invention.

As a further example of a process for making a preferred antacid composition from commercially available lactalbumin, the following specification is given:

A 300 gal. kettle equipped with a double-acting agitator is supplied to about ⅔ of its capacity with water and 22.8 ounces of sodium hydroxide is added and dissolved. To this solution, 100 pounds of denatured granular albumin is added and the slurry heated to 170° F. Sufficient ammonium hydroxide is then added to elevate the pH of the slurry to between 9 and 10.5. The mixture is desirably heated to about 175° F. One hundred pounds of aluminum hydroxide dry gel (a commercially available antacid preparation) is added and the contents of the kettle permitted to react at the elevated temperature for a period of about 45 minutes. The product is then pumped through a hammer mill and placed in a recirculating storage tank and spray dried. The dry antacid composition resulting from this process exhibits a pH of from 9.4 to 9.8.

It will be understood that the reaction of the protein and antacid reagent may be carried out at temperatures other than those given in the foregoing examples. In general, the desirable temperature range is between 140° F. to 190° F., the time required for reaction depending upon the temperature of the reaction mass as well as the nature of the particular reagents used.

The following examples of recipes indicate ranges of relative proportions of ingredients that have been found to produce useful products:

Albumin, 3 parts, aluminum hydroxide, 1 part
Albumin, 1 part, aluminum hydroxide, 3 parts
Albumin, 3 parts, magnesium trisilicate, 5 parts
Albumin, 5 parts, magnesium trisilicate, 3 parts
Albumin, 7 parts, calcium lactate, 1 part
Albumin, 3 parts, calcium lactate, 5 parts
Albumin, 3 parts, calcium carbonate, 5 parts
Albumin, 3 parts, calcium carbonate, 2 parts
Albumin, 3 parts, magnesium trisilicate, 3 parts, aluminum hydroxide, 2 parts
Albumin, 2 parts, magnesium trisilicate, 3 parts, aluminum hydroxide, 3 parts Albumin, 3 parts, magnesium trisilicate, 2 parts, aluminum hydroxide, 3 parts
Albumin, 2 parts, bismuth subnitrate, 1 part, aluminum hydroxide, 1 part
Albumin, 2 parts bismuth subcarbonate, 1 part, aluminum hydroxide, 1 part It should be here pointed out that the reaction of protein and antacid reagent does not appear to involve a stoichiometric relationship. Consequently, the relative proportions of reacting materials may vary without critical limitations. The presence of both classes of such materials, under the conditions herein specified, results in chemical reaction and the production of the desired antacid reaction product composition, this being the objective and accomplishment of the invention. Free antacid reagent, or unreacted protein, present in the final product along with the reaction composition, is not necessarily undesirable and may, in fact, be desirable to meet particular requirements. The advantageous characteristics of the invention are available and manifested when an appreciable amount of the reaction composition is present in the product, and this condition may reasonably be considered to obtain when at least about five parts of the antacid reagent is used with 95 parts of protein.

In the accompanying drawing, the neutralizing or buffering characteristics of certain antacids are shown and compared with the buffering action of the reaction product of the invention. In each of these graphs, any given point on the curve shows, for a given sample of antacid, the pH (on the ordinate scale) when the number of milliliters of 0.1040 N hydrochloric acid (shown on the abscissa scale) has been added to the sample.

In Fig. 1, the pH of 100 milliliters of water containing 3 gms. of calcium carbonate is shown at the several titration increments of the hydrochloric acid solution. An excessively high (for the stomach) level of alkalinity is maintained.

Figure 2:
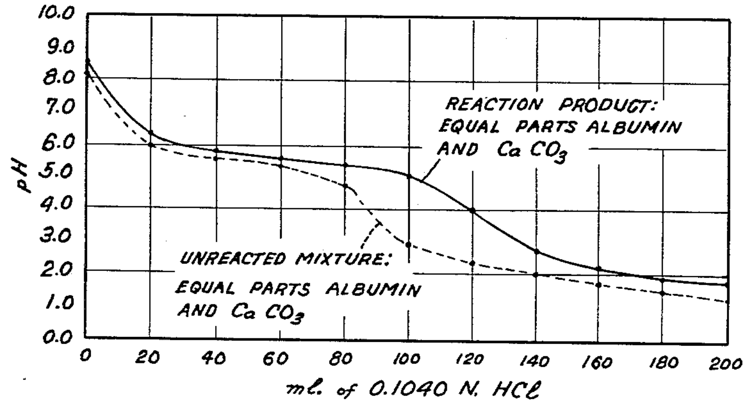

For comparison purposes, two graphs are shown in Fig. 2. The dotted line is the titration curve for 1½ gms. of calcium carbonate in 100 milliliters of water, into which 1½ gms. of solubilized or activated lactalbumin have been stirred without heating; i.e., a dry mix of equal parts of activated albumin and calcium carbonate placed in water for titration purposes. The solid line is the titration curve for 3 gms. of the reaction product prepared from equal parts of activated albumin and calcium carbonate as above described. The sustained buffering action of the reaction product, as compared with that of the corresponding unreacted mixture, is apparent.

Figure 3:
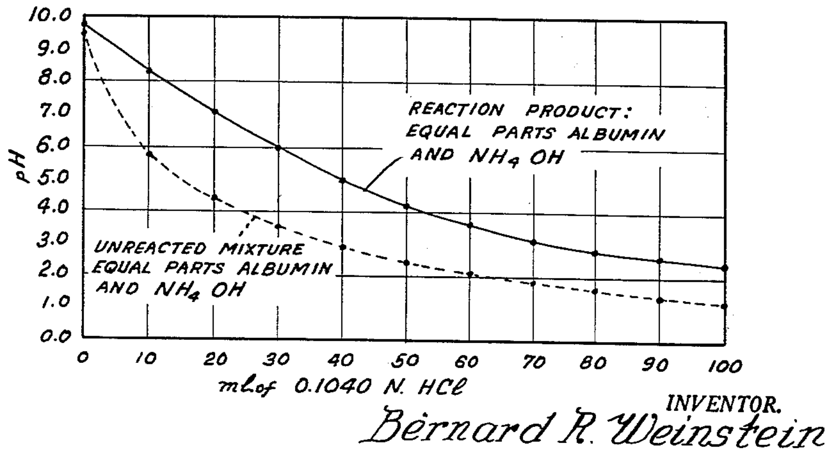

The comparative titration curves of Fig. 3 are similar to those of Fig. 2, except that aluminum hydroxide is used as the antacid chemical in place of calcium carbonate. The buffering or acid-absorbing properties of the reaction product are seen to greatly exceed the corresponding reaction of the unreacted mixture. Equal parts of activated albumin and ammonium hydroxide were used in the unreacted mixture and in the preparation of the reaction product, and the concentration in both instances was 3 gms. per 100 milliliters.

It will be understood that, while the buffering capacity of a reaction product of the invention will vary with differing reagents and proportions thereof used in its preparation, this is desirable in that it offers flexibility which permits the production of a series of compositions having a range of buffering capacity and pH characteristics. Also, with higher proportions of protein to antacid reagent, the product may have a high nutritional value with moderate therapeutic effect for use where such characteristics are desired. The composition may also include some unreacted protein material or unreacted antacid reagent, but the presence of such material does not interfere with the buffering action of the antacid reaction product.

I claim:

1. The method of making a nutrient antacid composition which comprises cooking a mixture of an antacid and a processed milk protein in a water slurry, said milk protein having a pH of from about 8 to about 10.5 and being the product of acid precipitation followed by alkali solubilization at an elevated temperature; and continuing said cooking at a temperature of at least about 140° F. for a period of time sufficient to effect reaction as indicated by conversion of the slurry to a heavy pasty mass.

2. The method of making a nutrient antacid composition which comprises cooking a mixture of an antacid and a processed milk protein in a water slurry, said milk protein having a pH of from about 8 to about 10.5 and being the product of acid precipitation followed by alkali solubilization at an elevated temperature; and continuing said cooking at a temperature of from about 140° F. to about 190° F. for a period of time sufficient to effect reaction as indicated by conversion of the slurry to a heavy pasty mass.

3. A nutrient antacid composition comprising a reaction product of a processed milk protein and an antacid, said milk protein being the product of acid precipitation followed by alkali solubilization at an elevated temperature; sad protein at a pH of about 8 to about 10.5 being reacted with the antacid at a temperature of at least about 140° F.

4. A nutrient antacid composition comprising a reaction product of a processed milk protein and an antacid, said milk protein being the product of acid precipitation followed by alkali solubilization at an elevated temperature; said protein at a pH of about 8 to about 10.5 being reacted with the antacid at a temperature of at least about 140° F., said product being characterized in that it exhibits a greater buffering effect than that of its unreacted constituents.

5. A nutrient antacid composition comprising a reaction product of a processed milk protein and a calcium salt selected from the group consisting of calcium carbonate, calcium lactate, calcium sulfate, calcium hydroxide and calcium gluconate, said milk protein being the product of acid precipitation followed by alkali solubilization at an elevated temperature; said protein at a pH of about 8 to about 10.5 being reacted with the calcium salt at a temperature of at least about 140° F.

6. A nutrient antacid composition comprising a reaction product of a processed milk protein and an aluminum hydroxide, said milk protein being the product of acid precipitation followed by alkali solubilization at an elevated temperature; said protein at a pH of about 8 to about 10.5 being reacted with the aluminum hydroxide at a temperature of at least about 140° F.

7. A nutrient antacid composition comprising a reaction product of a processed lactalbumin and an antacid, said lactalbumin being the product of acid precipitation from skim milk followed by alkali solubilization at an elevated temperature; said lactalbumin at a pH of about 8 to about 10.5 being reacted with the antacid at a temperature of at least about 140° F.

8. A nutrient antacid composition comprising a reaction product of a processed lactalbumin and a calcium carbonate, said lactalbumin being the product of acid precipitation from skim milk followed by alkali solubilization at an elevated temperature; said lactalbumin at a pH of about 8 to about 10.5 being reacted with the calcium carbonate at a temperature of at least about 140° F.

9. A nutrient antacid composition comprising a reaction product of a processed lactalbumin and an aluminum hydroxide, said lactalbumin being the product of acid precipitation from skim milk followed by alkali solubilization at an elevated temperature; said lactalbumin at a pH of about 8 to about 10.5 being reacted with the aluminum hydroxide at a temperature of at least about 140° F.

10. A nutrient antacid composition comprising a reaction product of a processed lactalbumin and a calcium salt selected from the group consisting of calcium carbonate, calcium lactate, calcium sulfate, calcium hydroxide and calcium gluconate, said lactalbumin being the product of acid precipitation from skim milk followed by alkali solubilization at an elevated temperature; said lactalbumin at a pH of about 8 to about 10.5 being reacted with a calcium salt at a temperature of at least about 140° F.

11. A nutrient antacid composition comprising a reaction product of a processed casein and an antacid, said casein being the product of acid precipitation from skim milk followed by alkali solubilization at an elevated temperature; said casein at a pH of about 8 to about 10.5 being reacted with the antacid at a temperature of at least about 140° F.

12. A nutrient antacid composition comprising a reaction product of an antacid and a processed coprecipitate of casein and lactalbumin, said coprecipitate being the product of acid precipitation from skim milk followed by alkali solubilization at an elevated temperature; said protein at a pH of about 8 to about 10.5 being reacted with the antacid at a temperature of at least about 140° F.

References Cited in the file of this patent

UNITED STATES PATENTS

| | | |
|---|---|---|
| 2,362,386 | Lipschitz | Nov. 7, 1944 |
| 2,721,861 | Paterson | Oct. 25, 1955 |